Figure 1:
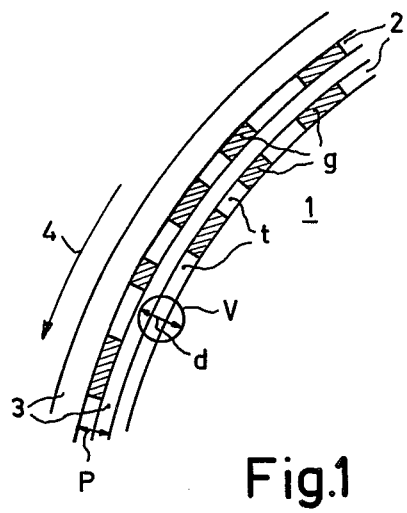

United States Patent [19]

Bouwhuis et al.

[11] 4,118,734
[45] Oct. 3, 1978

[54] OPTICAL VIDEODISC WITH VARIABLE WIDTH TRACKS

[75] Inventors: Gijsbertus Bouwhuis; Josephus Johannes Maria Braat; Bernardus Antonius Johannus Jacobs, all of Eindhoven, Netherlands

[73] Assignee: U.S. Philips Corporation, New York, N.Y.

[21] Appl. No.: 737,321

[22] Filed: Oct. 29, 1976

Related U.S. Application Data

[63] Continuation of Ser. No. 442,397, Feb. 14, 1974, abandoned.

[51] Int. Cl.² ............................................. H04N 5/76
[52] U.S. Cl. ...................... 358/128; 179/100.4 C; 179/100.3 V; 274/41.6 S; 274/41.6 R; 346/76 L
[58] Field of Search ............. 179/100.4 C, 100.4 R, 179/100.41, 100.3 V, 100.3 R, 100.3 F, 100.3 N; 358/128, 127, 130, 132; 274/41.6 S, 41.6 R; 346/76 L; 235/61.12 R; 340/173 LM

[56] References Cited

U.S. PATENT DOCUMENTS

| | | | |
|---|---|---|---|
| 2,326,564 | 8/1943 | Rigby | 179/100.4 C |
| 3,420,967 | 1/1969 | Goldmark | 179/100.4 C |
| 3,829,622 | 8/1974 | Elliot | 179/100.3 V |
| 3,894,179 | 7/1975 | Jacobs | 179/100.3 V |

*Primary Examiner*—Bernard Konick
*Assistant Examiner*—Alan Faber
*Attorney, Agent, or Firm*—Frank R. Trifari; Simon L. Cohen

[57] ABSTRACT

A disc-shaped record carrier is described on which information is recorded in an optical structure of trackwise arranged areas and intermediate areas. By adapting the average dimensions of the areas to the average spatial frequencies on the record carrier a read signal can be obtained of sufficient modulation depth and minimal distortion. This is accomplished by increasing the track width with decreasing radius of the record carrier.

2 Claims, 12 Drawing Figures

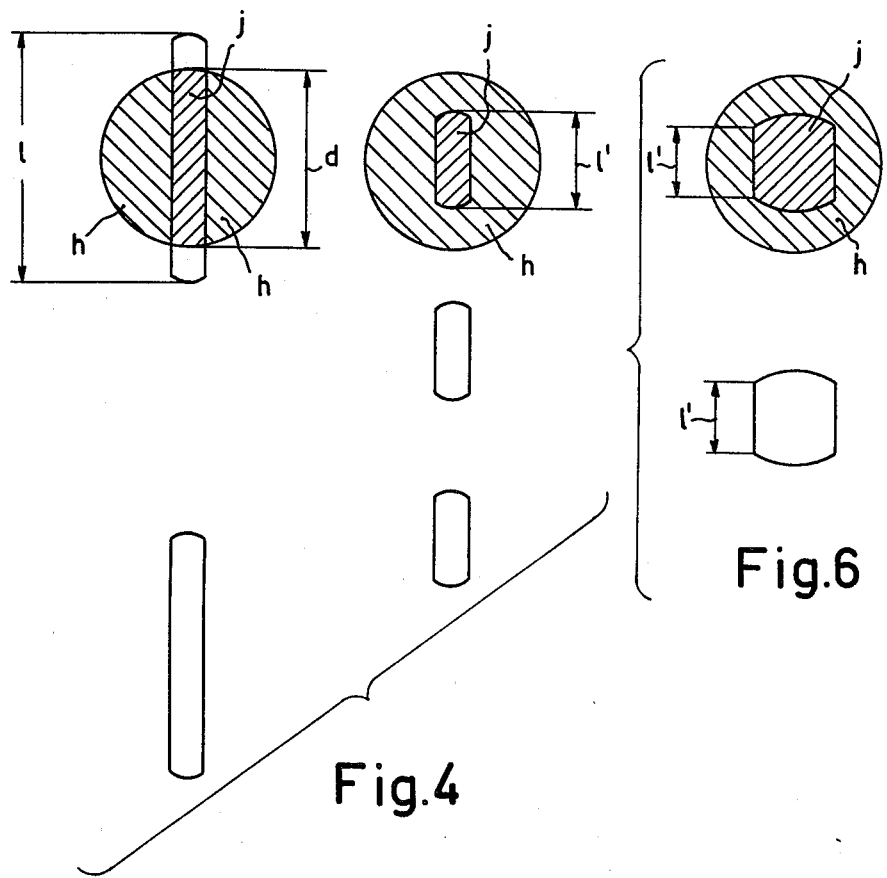
Fig.6
Fig.4
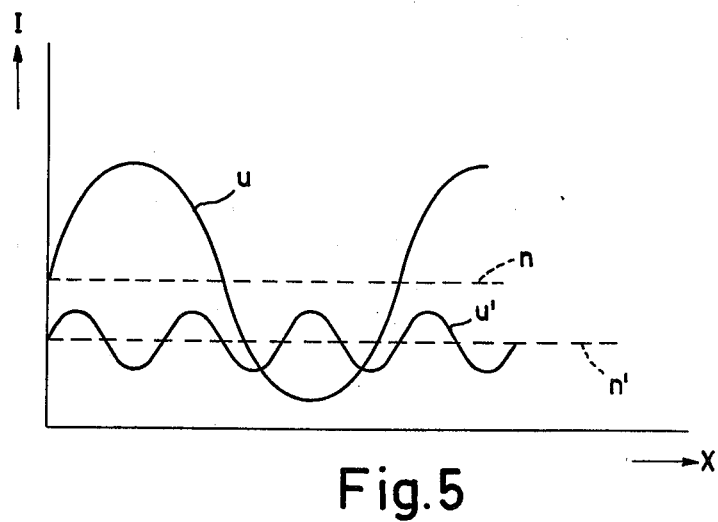
Fig.5

OPTICAL VIDEODISC WITH VARIABLE WIDTH TRACKS

This is a continuation of application Ser. No. 442,397, filed Feb. 14, 1974, now abandoned.

The invention relates to a record carrier on which information is recorded in an optical structure of trackwise arranged areas and intermediate areas, which areas have a different influence on a read beam of radiation than the intermediate areas and the lands between the tracks, the lengths of the individual areas and intermediate areas defining the information, for which record carrier the average spatial frequency of the areas in the read apparatus varies. The invention also relates to an apparatus for writing information on such a record carrier.

In this respect tracks is to be understood to mean a multitude of concentric tracks or, in the case of a round record carrier, one continuous spiral track, which spiral track may be divided into a number of quasi-concentric tracks. The average spatial frequency of the areas is to be understood to mean the average number of areas per unit of length.

For reading a record carrier provided with an optical information structure it has been proposed in U.S. Ser. No. 344,866, filed Mar. 26, 1973 abandoned in favor of U.S. Ser. No. 536,161 filed Dec. 24, 1974, now U.S. Pat. No. 3,956,582 issued May 11, 1976, to project a radiation spot of dimensions greater than the width of a track onto the information structure. The radiation emerging from the record carrier is concentrated onto a radiation sensitive detector by a lens of limited numerical aperture. At the areas in the information structure diffraction occurs, the diffracted beams of radiation for the most part falling outside the lens aperture. Consequently, if an area is located in front of the lens, less radiation will reach the detector than if there is no area in front of the lens.

In order to obtain an optimum optical signal the geometry of the areas on the record carrier and the dimensions of the radiation spot, as well as the intensity distribution over the radiation spot should match each other. The optimum aperture of the lens which forms the radiation spot is then defined for a specific geometry of the areas. The average spatial frequency and thus the average length of the areas, however, may vary over the various tracks. Therefore, all the tracks cannot be read in an optimum manner by means of a single radiation spot formed by one specific lens.

The conversion of the information recorded in the optical structure of the record carrier into an electrical signal need not always be linear. It may happen that the detector receives a certain threshold intensity, whilst the edge of the area is not yet correctly positioned relative to the radiation spot. This results in a distortion of the detector signal, especially at low spatial frequencies, i.e. at great average lengths of the areas and the intermediate areas in the tracks.

It is an object of the invention to provide a record carrier which solves one or both of these problems. For this purpose, according to the invention, the average dimensions of the areas in the tracks correspond to the average spatial frequency in the tracks in such a way that, when reading the record carrier by means of a read beam of radiation which is focussed onto the information structure to a radiation spot larger than the track width and, in the case of several tracks, is smaller than the sum of the track width, and twice the distance between two consecutive tracks, a signal of sufficient modulation depth and minimal distortion is obtained.

According to a further feature of a record carrier according to the invention, the track width increases as the average spatial frequency of the block in the tracks increases. This allows the record carrier according to the invention to be read in an optimum manner by means of a single radiation spot of one specific geometry and one specific intensity distribution over the radiation spot. Adaptation of the track width furthermore ensures that those positions of the radiation spot and areas relative to each other, where the intensity of the radiation to the detector is half the difference between the maximum and minimum intensities of the radiation to the detector, sufficiently approximate the desired positions.

According to a further feature of a record carrier, according to the invention, this may also be achieved for a low average spatial frequency of the areas by making the average length of the areas smaller than one half the period which would correspond to the intended spatial frequency.

According to the invention yet another possibility at a low average spatial frequency is to taper the ends of the areas off to a point in the longitudinal direction of the tracks.

Figure 2:
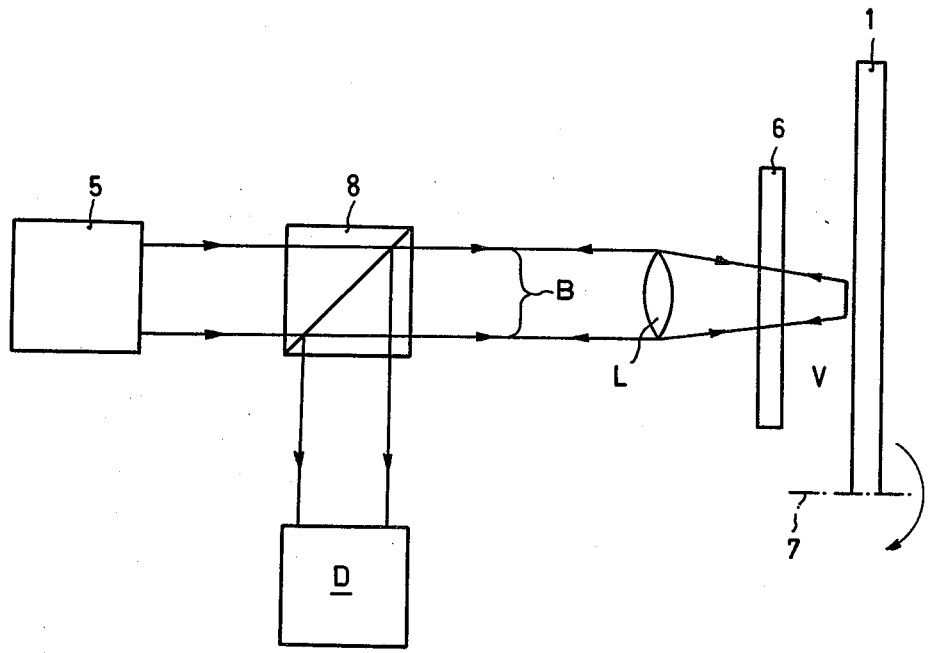
Figure 3:
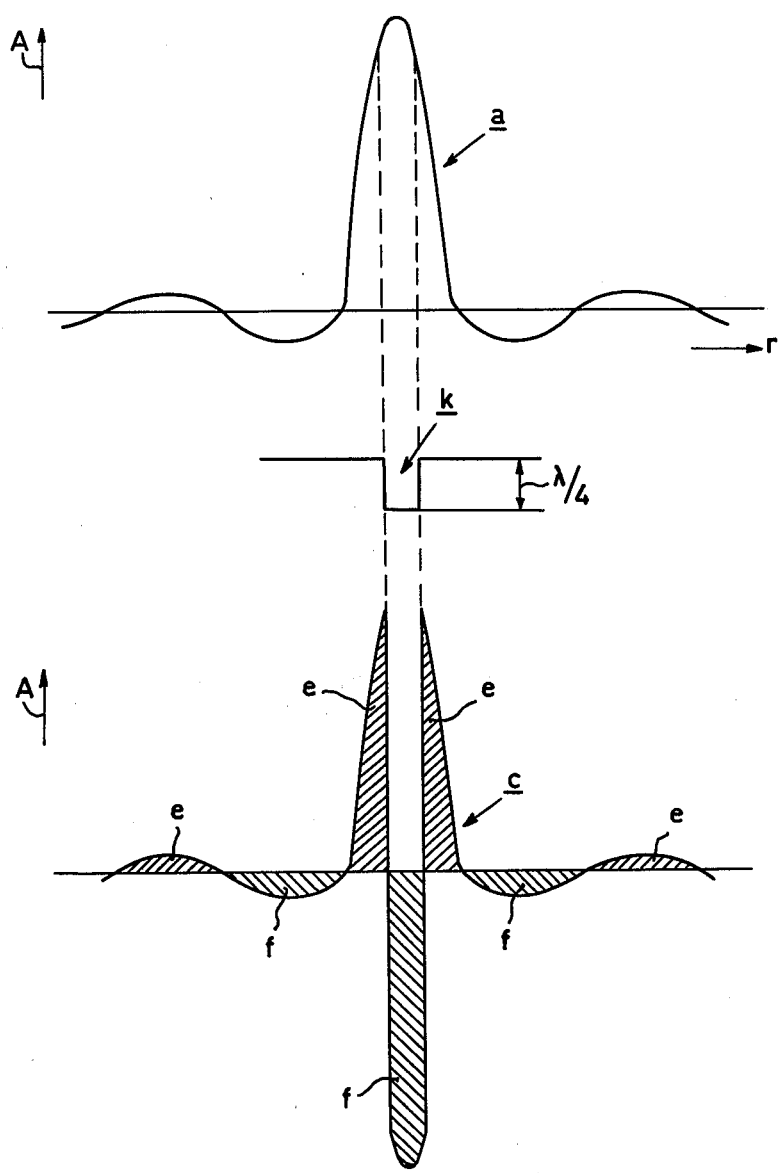
Figure 7:
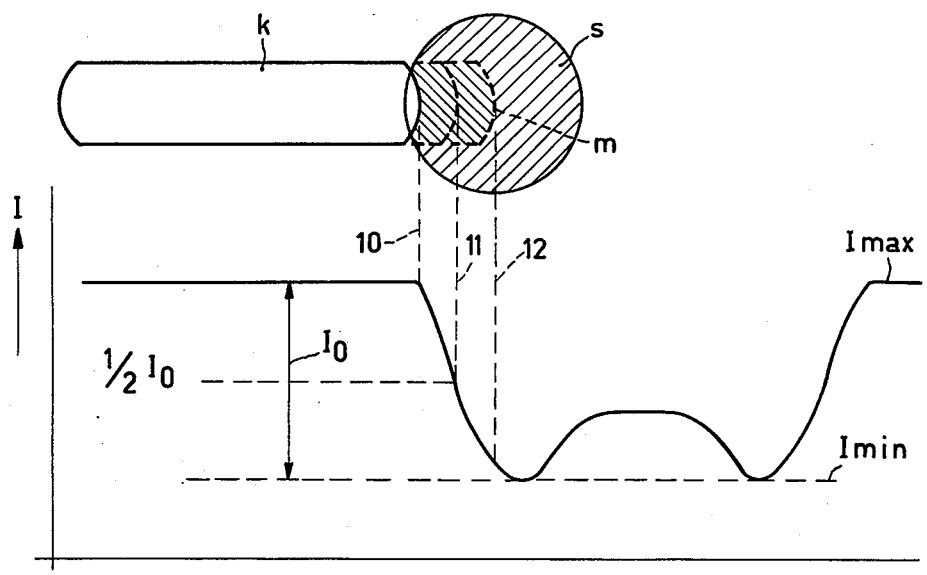
Figure 8:
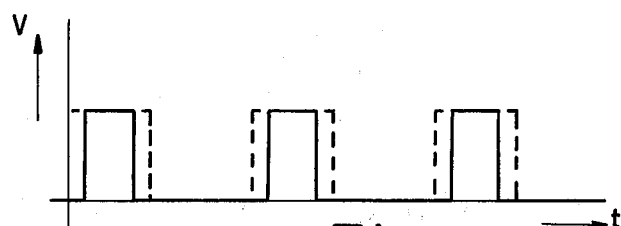
Figure 9:
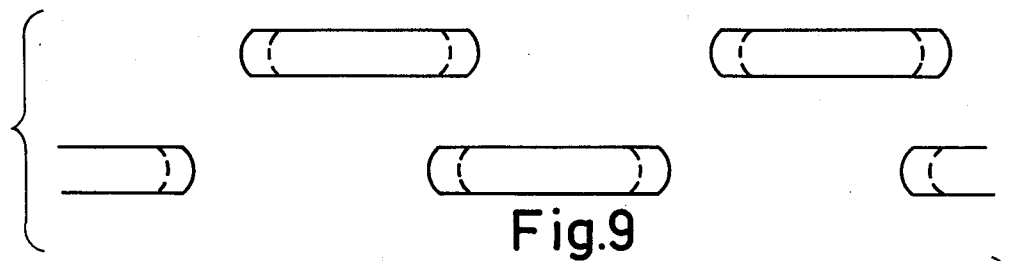
Figure 10:
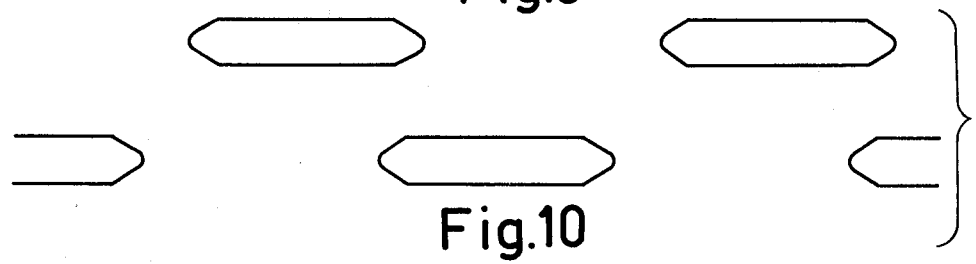
Figure 11:
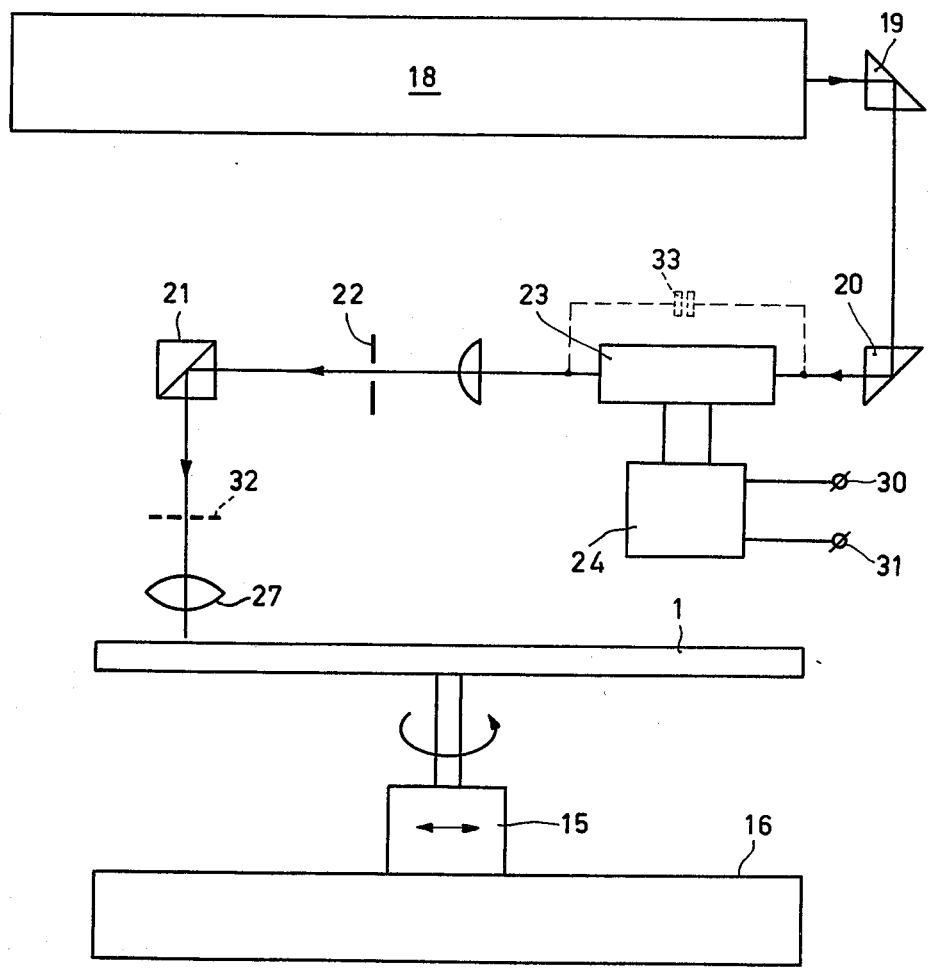

The invention will now be described in more detail with reference to the drawing, in which:

FIG. 1 shows a part of the optical structure of a record carrier to be read,

FIG. 2 represents a previously proposed apparatus for reading such a record carrier, FIG. 3 represents the amplitude distribution of a radiation spot before and after interaction with an area of the record carrier, FIG. 4 shows parts of two information tracks of different spatial frequencies, FIG. 5 represents the signals produced by interaction of a radiation spot with the tracks of FIG. 4, FIG. 6 shows a part of a track of high spatial frequency adapted according to the invention, FIG. 7 shows the intensity variation of a radiation beam emerging from the record carrier as a function of the position of the edge of an area relative to the radiation spot, FIG. 8 represents a deformation of the detector signal which occurs at low spatial frequencies, FIGS. 9 and 10 show parts of optical information structures which has been corrected for said deformation in accordance with the invention, FIG. 11 shows an apparatus for writing information on a record carrier according to the invention.

Figure 12:
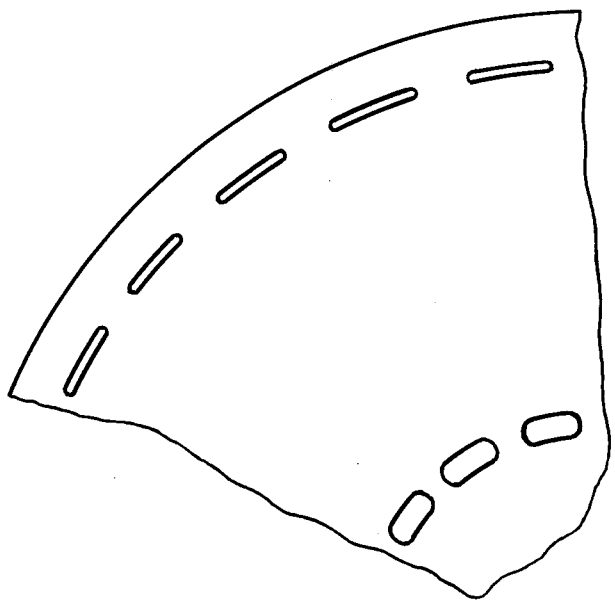

FIG. 12 shows a part of the optical structure of a record carrier according to the invention.

FIG. 1 represents a part of an optical structure of a record carrier to be read, specifically a round record carrier 1. On the record carrier 1 a number of regions $g$ are arranged in tracks 2. The blocks have a different effect on a rediation beam which is incident on the record carrier than the rest of the record carrier, i.e. than the intermediate areas $t$ and the information-free lands 3. The tracks may be arranged parallel to each other, i.e. concentric relative to the center of the record carrier. The record carrier may also be provided with a continuous spiral track. The lengths of the areas and the intermediate areas are determined by the information stored in the track.

A radiation beam, not shown, produces a radiation spot V on the optical structure. By moving the record carrier in the direction indicated by the arrow 4, the radiation beam is time-modulated in accordance with the sequence of regions and intermediate areas in a track. The diameter $d$ of the radiation spot V is greater than the width of the tracks 2, but smaller than the sum of the track width and twice the width of the information-free lands 3.

The numerical aperture of a lens L (see FIG. 2), which serves to image the record carrier onto a detector D, is selected so, that said lens cannot image the narrow regions $g$. Then, as long as a radiation spot is projected outside an region $g$, the detector D will receive a maximum amount of radiation. When a radiation spot is projected onto an region $g$ of a finer structure than $d$ much radiation is diffracted outside the entrance pupil of the lens L, so that substantially no radiation impinges on the detector.

The information may be stored in the record carrier as an amplitude structure. The regions and areas being coplanar with the surface of the record carrier. The regions may then be radiation-absorbing, while the record carrier itself may be radiation-transmitting or radiation-reflecting, or conversely, the regions may be radiation-transmitting or radiation-reflecting, while the record carrier is radiation-absorbing. The plane of the regions may also be disposed at a small distance from the surface of the record carrier. An example of such a phase structure is a reflecting record carrier, i.e. which pits are pressed at the location of the areas.

For a maximum modulation of the detector current by said pattern of pits on the record carrier the radiation beams reflected at the bottom of a pit and at the record carrier surface adjacent thereto must have a difference in phase of 180° and have the same intensity. The 180° phase difference is obtained by giving the pit a depth equal to a quarter of the wavelength of the radiation used, so that the difference in path length between the two reflections will be half a wavelength. Equality of the intensities is obtained by ensuring that an equal amount of radiation is incident beside and in a pit. Thus, every track geometry is associated with an optimum intensity distribution over the radiation spot and, because that distribution depends on the diffraction at the lens aperture, also with an optimum value of the aperture of the lens which forms the radiation spot.

This is illustrated in FIG. 3. The curve $a$ represents the amplitude A as a function of the radius $r$ in a round radiation spot. If said radiation spot is projected onto a pit $k$ which is situated in a record carrier at a depth of a quarter wavelength an amplitude distribution is obtained in accordance with the curve $c$. The radiation reflected by the bottom of the pit is 180° phase shifted relative to the radiation reflected by the area surrounding the pit. The detector is located on the optical axis in a point which is situated comparatively far from the pit. The total radiation in this point can be determined by addition of the complex amplitudes of all components $e$ and $f$. It is evident that by an appropriate choice of the amplitude distribution and of the dimensions of the pit the sum of the complex amplitudes and thus the intensity of the radiation which is incident on the detector, can be made negligibly small.

As stated previously, the length of the pits is determined by the information which is recorded in the record carrier. For a great number of consecutive pits, however, an average length can be given. Said average length may now vary over the record carrier. This is for example the case with a round disc-shaped record carrier on which a television programme is written and of which each concentric or quasi-concentric track contains the information of one frame. It is obvious that for such a record carrier the average length of the pits in the outer track is greater than that of the pits in the inner track, for example by a factor 3 for an inner diameter of 10 cm and an outer diameter of 30 cm. This means that when the aperture of the lens L is selected so that an outer track is read in an optimum manner, an inner track cannot be read in an optimum way by means of said lens.

FIG. 4 represents parts of an information structure with a great average pit length ($l$) and an information structure with small average pit length ($l'$). In reality the lengths of the pits in a track may still be modulated in accordance with the information stored in the track.

It is assumed that the amplitude distribution over the radiation spot and the dimensions of the radiation spot are such that the track of an average pit length $l$ allows optimum reading. This means that when the radiation spot is projected on a pit the sum of the complex amplitudes of the reflected radiation components $j$ and $h$ is substantially zero, so that the detector receives a minimum amount of radiation. If the radiation spot is projected midway between two pits, no diffraction will occur, so that the amount of radiation on the detector is maximum. The variation of the radiation intensity as a function of the travel $x$ of the read spot in the direction of the track is then as represented by the curve $u$ in FIG. 5.

If the same radiation spot is used for reading the information track of short average pit length $l'$, the variation of the intensity of the radiation intercepted by the detector will be far more unfavourable as is represented by the curve $u'$ in FIG. 5. The spacing between the pits in the longitudinal direction of the track is smaller than the diameter of the radiation spot, so that the radiation spot is always projected on a pit or on parts of adjacent pits. As a result, the maximum radiation intensity at the detector will be substantially smaller than when reading a track of great average pit length. When the radiation spot is projected onto one pit the complex amplitudes of the reflected radiation components $j$ and $h$ will be anything but equal, so that the minimum of the radiation intensity which is intercepted by the detector is higher than when a track of great average pit length $l$ is read. The modulation depth of the detector signal when reading a track of small average pit length is smaller than when reading a track of great average pit length.

According to the invention the situation can be improved upon for a track of small average pit length, allowing for the amplitude distribution over the radiation spot, by adapting the widths of the pits in such a way that when the radiation spot is projected onto a pit, the intensities of the radiation reflected by the bottom of the pit and of the radiation reflected by the area surrounding the pit approximate each other closely enough.

FIG. 6 shows a part of an information track of an average length pit $l'$, according to the invention. The width of the pits is substantially greater than in FIG. 4. This ensures that the level of the minimum radiation intensity at the detector is reduced, so that the modulation depth of the detector signal becomes greater than that according to the curve $u'$ in FIG. 5.

However, widening the tracks also has an influence on the d.c. component in the detector signal. It is obvious that the d.c. component varies with a variation of the average spatial frequency i.e. such that at increasing average spatial frequency of the pits the d.c. component decreases; compare levels $n$ and $n'$ in FIG. 5. The variation of the d.c. component increases over a certain range of spatial frequencies as the pits become wider. The variation of the d.c. component during reading of a record carrier may present difficulties when electronically processing the electrical signal from the detector. If a minimal variation of the d.c. component is desirable, for example for a certain coding of a television signal on the record carrier, the track width will be the result of a compromise. In that case some of the improvement in modulation depth attainable according to the invention will have to be sacrificed in favour of an as constant as possible d.c. component in the detector signal.

In additional to being useful in a round record carrier with an equal amount of time information per track, the invention may also be employed in any record carrier in which for some reason the spatial information density in the optical structure changes in a specific direction.

It is assumed that when the center of the radiation spot passes the beginning or end of a pit, while the record carrier is being read, the radiation intensity intercepted by the detector amounts to half the difference between the possible maximum and minimum radiation intensity at the detector. However, in practice this requirement is not always met and non-linearities result, especially at low average spatial frequencies.

FIG. 7 shows how, in the case of a pit structure of low spatial frequency, the intensity of the radiation to the detector varies as a function of the position of the radiation spot relative to the pit. In this case it is assumed that a radiation spot $s$ formed by Gaussian intensity distribution has a diameter of 1.3 $\mu$m. The pit has a length of 3 $\mu$m and is 0.8 $\mu$m wide. The consecutive positions of the end of the pit relative to the radiation spot are shown dotted and are designated by 10, 11 and 12. The intensity $I_o$ is half $I_{max} - I_{min}$, $I_{max}$ representing the total intensity of the radiation to the detector if the radiation spot is projected outside a pit $I_{min}$ is the minimum intensity of the radiation directed towards the detector if the radiation spot is projected onto a pit. The "hump" in the curve which represents the intensity in FIG. 7 is caused by the fact that the pit and the radiation spot are not adapted to each other. For narrower pits the "hump" will disappear. The Figure shows that already in situation 11, i.e. when the end of the pit is still at a comparatively great distance from the center $m$ of the radiation spot, the intensity of the radiation reflected to the detector has already dropped to about $\frac{1}{2} I_o$. As a result of this, the electrical signal supplied by the detector will have a shape as represented by the uninterrupted line in FIG. 8.

The signal is strongly distorted relative to the signal which is represented by a dotted line, which would be obtained if the value $\frac{1}{2} I_o$ were attained if the end of the pit should coincide with the center $m$ of the radiation spot $s$.

According to the invention the said non-linearity can be substantially avoided, as shown in FIG. 12, by making the outer tracks of the said round record carrier, narrow. This ensures that the point in the radiation spot where the end of a pit must be located in order that the radiation intensity to the detector attains the value $\frac{1}{2} I_o$ is shifted towards the center of the radiation spot. A higher spatial frequencies, when the radiation spot is continually projected onto a pit or parts of adjacent pits, the said non-linearity is no longer significant. The tracks where the average pits are shorter may be wider, so that the requirement for optimum reading is met: as many as possible equal intensities of the radiation emerging from a pit and of that from the area surrounding a pit. Thus, the influence of two errors can largely be eliminated by a single step, namely by making the tracks with a low spatial frequency of the optical information narrower than the tracks with a high spatial frequency.

According to the invention it is equally possible in the case of a record carrier with constant track width to take a step so as to prevent non-linear reading. The pits themselves can be made slightly shorter. This is illustrated in FIG. 9 by dotted lines; the uninterrupted lines represent a previously proposed pit structure. By making the average lengths of the pits smaller than half the average period of the pit spatial frequency it can be achieved that the spacings between the positions at which the reflected radiation intensity attains the level $\frac{1}{2} I_o$ become equal to the desired spacing of half a period.

The same effect is obtained by tapering the pits to a point as is shown in FIG. 10.

The invention is described with reference to a record carrier having a reflecting pattern of pits. However, because the invention in general yields an improvement for a record carrier which is destined to be read in accordance with the principle: radiation spot greater than the track width, it may be employed in many other record carriers. For example, a fully transparent record carrier is conceivable with areas disposed at half a wavelength from the record carrier surface (phase structure) or a transparent or reflecting record carrier provided with trackwise arranged radiation-absorbing areas (amplitude structure). The advantages of the read principle: radiation spot greater than the track width, however, are particularly predominant for a phase structure, because a small phase variation results in a substantial variation of the detector signal.

For writing information on a record carrier according to the invention use can be made of a special write apparatus. Said apparatus is based on a previously proposed device (described in the previous U.S. Pat. No. 3,894,179 and is provided with special means according to the invention for influencing the write beam of radiation, independently of the information to be recorded, in such a way that in the eventual record carrier the average dimensions of the areas match the average spatial frequencies on the record carrier. The eventual record carrier may be the record carrier on which information is written with the aid of the said apparatus, called the master record carrier, or a record carrier which via a pressing method is obtained from the master record carrier.

As is shown in FIG. 11, the apparatus includes a radiation source 18, which supplies a radiation beam of sufficient power. Said beam is directed to the record carrier 1 on which information is to be written via the prisms 19, 20 and 21 and concentrated to a small radiation spot by an objective lens 27. The record carrier is provided with a layer which is sensitive to the radiation used. The radiation path between the source 18 and the record carrier 1 furthermore includes a diaphragm 22 and an electro-optic radiation modulator 23. Said radiation modulator in conjunction with the electronic control device 24 constitutes a modulation unit. By means of said modulation unit the information, for example a television programme, which is applied to the terminals 30, 31 in the form of an electrical signal, can be converted into radiation pulses of the laser source. At specific instants, given by the information at the terminals 30, 31 radiation spots are projected on the record carrier.

The record carrier has a round circumference and is rotated about its axis with the aid of a motor 15, which by means of a carriage 16 is radially movable, thus allowing for example a spiral track to be written on the record carrier 1.

In order to enable the width of the tracks to be written to be varied in accordance with the average spatial frequency (compare FIGS. 4 and 6), care is taken that according to the invention the size of the radiation spot projected onto the record carrier is adjustable in one direction. For this purpose, for example diaphragm 22 may be adjustable in one direction. However, preferably a diaphragm which is adjustable in one direction is disposed in the immediate vicinity of the objective lens 27, as is designated by 32.

According to the invention, the areas with tapered ends as shown in FIG. 10 can be written by adapting the rise times of the radiation pulses to be formed in the modulation device (23, 24). This can be achieved, for example, by including a variable capacitance 33 in parallel with the capacitance of the electro-optic modulator, so that the RC-time, which determines the rise time, of the modulation device can be adjusted to different values for different spatial frequencies on the record carrier.

The modulation device (23, 24) also enables a pattern of pits as shown dotted in FIG. 9 to be obtained by electronic means. This is for example possible, independent of the information to be written, by inserting a variable delay between the leading and trailing edges of the square-wave information signals applied to the terminals 30 and 31.

As indicated in the aforementioned U.S. Pat. No. 3,956,582 the record carrier may be utilized to record color television signals. Such signals are modulated by picture information in such a manner that, while the instantaneous frequency of the signal constantly changes the signals vary about an average value to which a normal television tuner is set. Thus an average television signal can be said to have an average temporal frequency, or frequency with respect to time. When such a signal is recorded along the length of a track on a disc or along the length of a television tape the temporal frequency of the signal is registered as a spatial frequency on the recording medium. The spatial frequency of the recorded data depends on the temporal frequency of the signal to be recorded and on the speed between the recording medium and the recording apparatus or stylus. As with the temporal frequencies the spatial frequencies will also vary within a small section of recorded track, but will vary about an average spatial frequency on a relatively long track section if the recording medium-stylus speed is kept constant. On a reel of magnetic television recording tape, therefore, the average spatial frequency throughout the reel of tape corresponds to the average temporal frequency of the television channel recorded. Recording on a disc, however, involves changes in the average spatial frequency due to the change in recording medium-stylus speed. Thus, on a twelve inch record having an inner recording track diameter of 3 inches, the change in recording medium-stylus speed is 400%. That is, the recording stylus speed at the twelve inch diameter is four times that at the three inch diameter. This produces a shift in the average spatial frequency measured over each revolution. In view of the fact that this produces disturbing reactions in the read beam when the disc is played back the disc is provided with a track that progressively widens as it nears the center of the disc. As mentioned above, this may be accomplished using an adjustable diaphragm, the adjustment of which may be made manually, or, if a diaphragm of the type used in simple automatically adjusting cameras is used, the adjustment may be made electrically in response to any electrical pick up connected to the apparatus for moving the beam. Such pick ups are commonly used in most automatic machine tools.

What is claimed is:

1. A record carrier of the type on which information is recorded in the form of an optical structure on substantially concentric tracks in the form of regions and intermediate areas, said regions having different optical properties than the intermediate areas and the lands between the tracks, the improvement wherein the width of the tracks increases as the radial positions of the tracks decrease.

2. Apparatus for writing information on a record carrier in the form of an optical structure of substantially concentric tracks as regions and intermediate areas, the regions having different optical properties than the intermediate areas and the lands between the tracks, the apparatus being of the type comprising a radiation source for supplying the writing beam of radiation, and a modulation device means for varying the pulse repition rate of pulses of said radiation in accordance with the information to be written, the improvement wherein the apparatus comprises compensating means for widening the beam independently of the information to be written as the radial position of the tracks decreases.

* * * * *